(No Model.)
W. J. WAYNE.
SULKY.
No. 529,822. Patented Nov. 27, 1894.
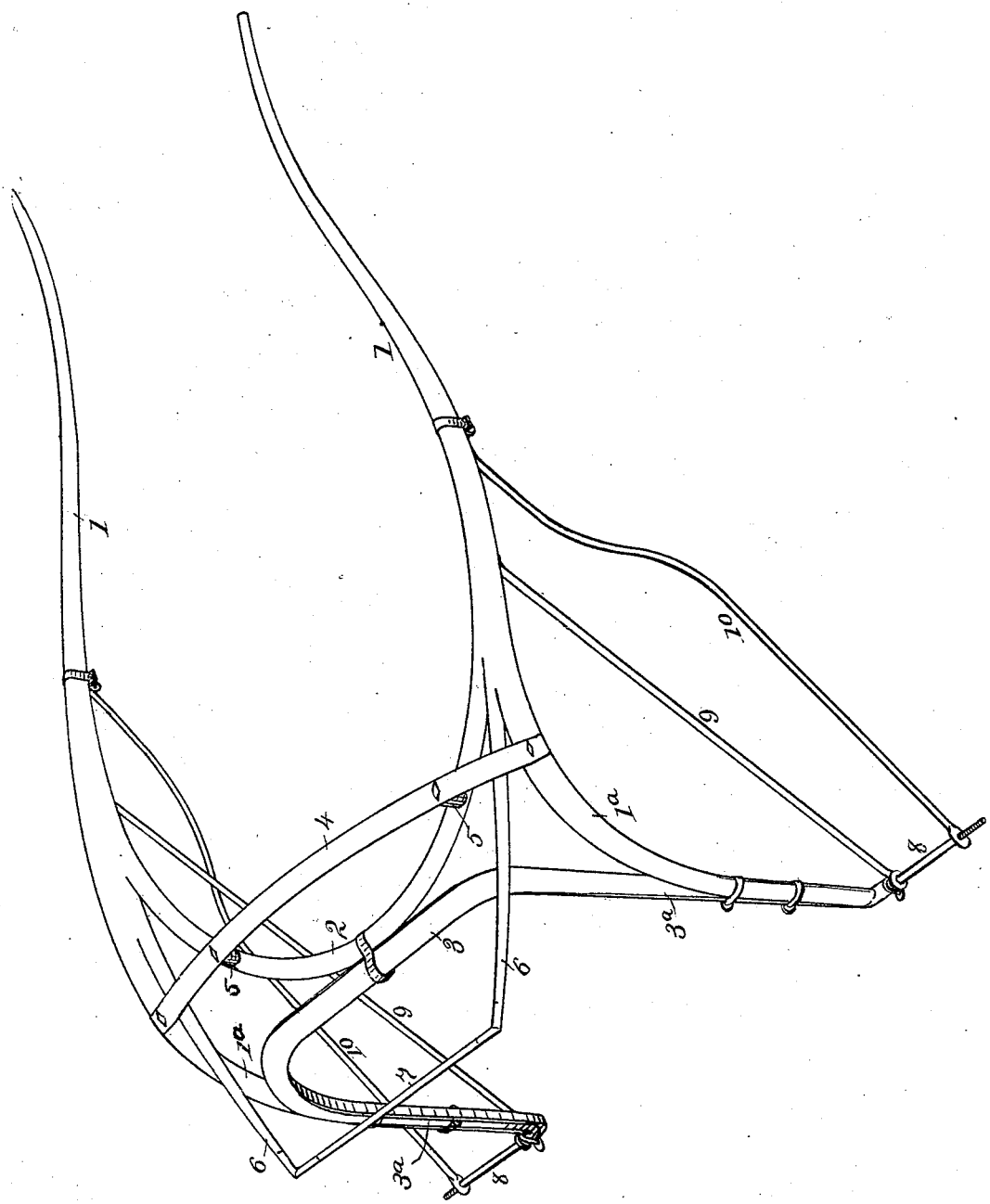
ATTEST
Helen Graham
William Graham.
INVENTOR
W. J. WAYNE.
by his attorney
L. P. Graham

UNITED STATES PATENT OFFICE.

WILLIAM J. WAYNE, OF DECATUR, ILLINOIS.

SULKY.

SPECIFICATION forming part of Letters Patent No. 529,822, dated November 27, 1894.

Application filed January 27, 1894. Serial No. 498,190. (No model.)

*To all whom it may concern:*

Be it known that I, WILLIAM J. WAYNE, of Decatur, in the county of Macon and State of Illinois, have invented certain new and useful Improvements in Sulkies, of which the following is a specification.

In the construction of speeding and racing sulkies lightness is desirable, in order that the horse may be retarded as little as possible, strength is necessary to safely carry the driver, stiffness is necessary, or at least very desirable, to maintain the parts in proper co-relation, and compactness, together with plenty of space under the frame, is necessary to permit free movement of the horse.

This invention is designed to combine the above enumerated qualities to a heretofore unattained extent, and particularly to stiffen the shafts against independent vertical swing, or, in other words, to hold the shafts firmly in the same plane.

The invention relates solely to the construction of the frame, and it is embodied in the details of construction and combinations of parts hereinafter set forth and claimed.

In the drawing forming part of this specification the parts of the frame essential to this invention are shown in perspective.

The shafts 1 are curved downward at their rear ends, as shown at 1ª. A horizontal circle bar 2 connects one shaft with the other. The axle bar 3 is arched, is connected with the circle bar at its center, and is also connected at its ends with the terminations of the shafts and extended conjointly with the shafts to the spindles 8. A brace bar 4 is sprung over truss blocks 5 on the circle bar, is secured to such blocks, and its depressed ends are secured to the shafts. A tail frame 6 extends rearward from the shafts, beyond the axle bar, and aids the brace bar in providing support for the seat. Rods 9, which are preferably tubular, connect with the inner ends of the spindles, extend obliquely upward to the shafts, and connect with the shafts at points in advance of the connections of the circle bar. Brace rods 10 connect at their lower ends with the outer ends of the spindles and at their upper ends with the shafts at points in advance of the connections of brace rods 9, and they are also preferably tubular.

The brace bar 4, which is held more or less under strain, tends, through its elasticity, its truss conformation and its co-relation to the other parts, to strengthen and stiffen the frame in all directions, and particularly to stiffen the shafts against independent vertical displacement, while the peculiar construction and co-operative arrangement of the shafts, the axle bar and the circle bar contribute to produce the desired effect. The rods 9 and 10 have the double effect of bracing the spindles and of aiding in holding the shafts in the same horizontal plane, and it is obviously a matter of some indifference, so far as the result is concerned, which rod is connected with the shaft in advance of the other.

The connection of rods 10 with the shafts are of a pivotal nature, as indicated in the drawing, and this peculiarity enables the rods to be swung out of the way of the wheels to permit the same to be put on the spindles or taken off.

The frame, as described, is to be ironed and otherwise equipped in the customary, or any desirable manner, the iron for the single tree connection preferably extending from the conjunction of the axle and circle bars to the brace bar, and the construction is particularly applicable to the use of bicycle wheels.

Having thus described my invention, I claim as new and desire to secure by Letters Patent—

1. A sulky frame comprising shafts curved downward at their rear ends, a horizontal circle bar extending from one shaft to the other, an arched axle bar connected at its center with the circle bar and at its ends with the curved ends of the shafts, and a transverse brace bar sprung over the circle bar, connected therewith and connected, at its ends, with the shafts, substantially as set forth.

2. A sulky frame comprising shafts curved downward at their rear ends, a horizontal circle bar extending from one shaft to the other, an arched axle bar connected at its center with the circle bar and at its ends with the curved ends of the shafts, truss blocks on the circle bar, and a transverse brace bar sprung over the truss blocks, secured thereto, and secured at its ends to the shafts, substantially as set forth.

3. A sulky frame comprising shafts curved downward at their rear ends, a horizontal circle bar extending from one shaft to the other, an arched axle bar connected at its center with the circle bar and at its ends with the curved ends of the shafts, a transverse brace bar sprung over the circle bar secured thereto and secured at its ends to the shafts, and a tail frame extending from the shafts rearward beyond the axle bar, substantially as set forth.

4. A sulky frame consisting in the combination of shafts curved downward at their rear ends, a horizontal circle bar extending from one shaft to the other, an arched axle bar connected at its center with the circle bar and at its ends with the curved ends of the shafts, spindles at the conjoint terminations of the axle bar and the shafts, brace rods extending from opposite ends of the spindles and connecting with the shafts one in advance of the other, and a transverse brace bar sprung over the circle bar, connected therewith, and connected at its ends to the shafts, substantially as set forth.

In testimony whereof I sign my name in the presence of two subscribing witnesses.

WILLIAM J. WAYNE.

Attest:
   JOSEPH C. HOSTETLER,
   L. P. GRAHAM.